United States Patent Office.

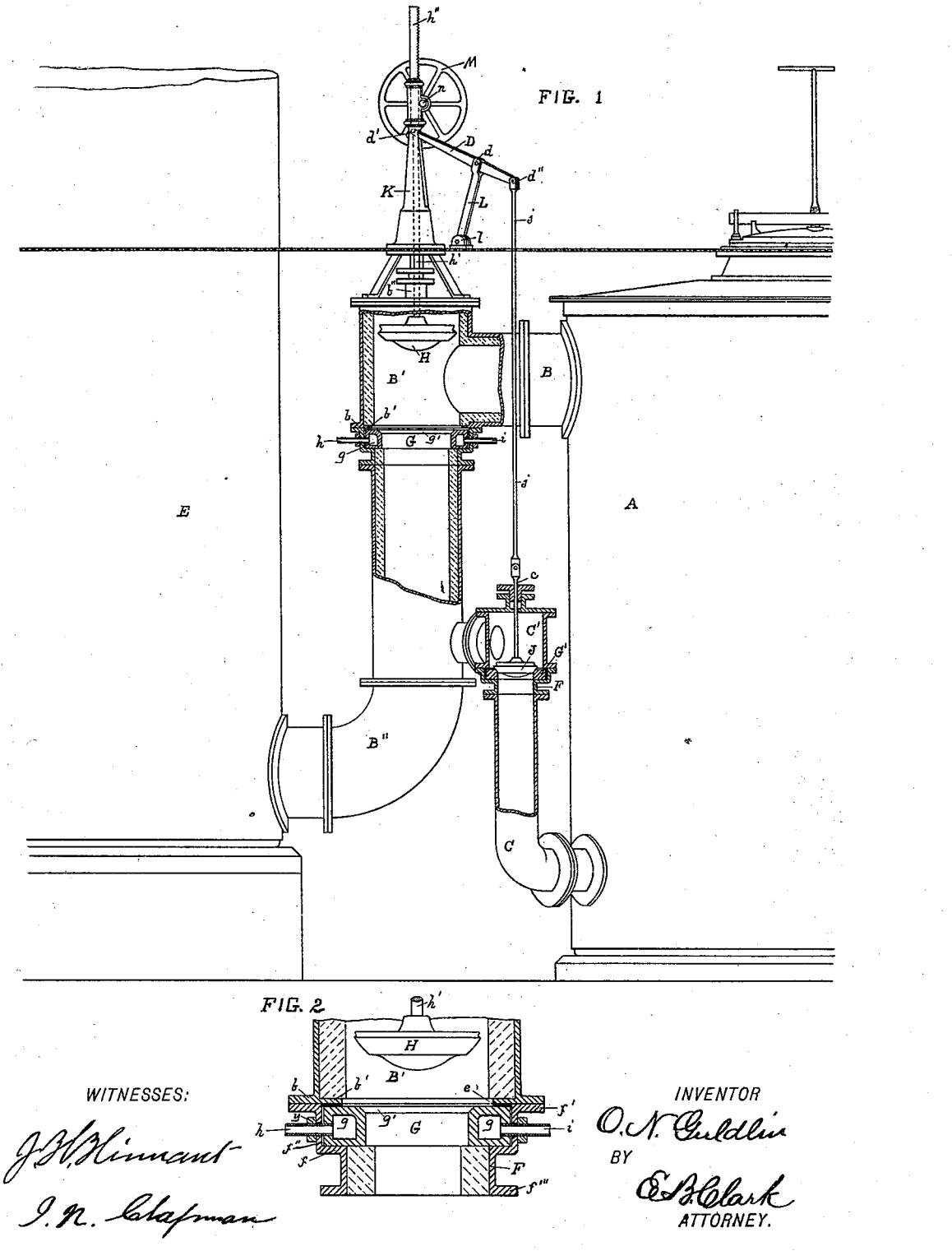

OLAF N. GULDLIN, OF FORT WAYNE, INDIANA.

VALVE-SEAT.

SPECIFICATION forming part of Letters Patent No. 540,787, dated June 11, 1895.

Application filed August 7, 1894. Serial No. 519,715. (No model.)

*To all whom it may concern:*

Be it known that I, OLAF N. GULDLIN, a citizen of the United States, residing at Fort Wayne, in the county of Allen and State of Indiana, have invented certain new and useful Improvements in Valve-Seats; and I do hereby declare the following to be a full, clear, and exact description of the invention, such as will enable others skilled in the art to which it appertains to make and use the same.

This invention relates to an adjustable and removable valve seat and its casing for a hot valve box, adapted for use in gas apparatus, metallurgic and other furnaces.

The object of my invention is to provide a readily detachable valve seat and casing or pipe section for a hemispherical or disk valve,—said valve seat being so arranged that it can be readily removed from the valve box when injured by excessive heat, or when, from any cause, it has become defective.

My removable valve seat is annular, and is preferably made hollow for the circulation of air, steam, or water for keeping it cool. It is detachably held in a suitable recess in the removable casing or pipe section at the base of the valve box, so that when it becomes warped by heat or worn by use, it can readily be removed and replaced by a new one without the necessity of renewing other parts of the valve or pipe connections. During the passage of hot gaseous products from a gas generating furnace, the conical or disk valve is retracted out of the path of the gas, so that it is not liable to be injured by excessive heat, but the valve seat is necessarily exposed to passing hot gases and is liable to become warped or twisted by overheating, so that it is important to provide a construction by which such seat can be readily removed and a new one substituted therefor.

My invention is illustrated in the accompanying drawings, in which—

Figure 1 represents a gas apparatus with the valve-boxes and part of the pipe connections in vertical section. Fig. 2 represents a vertical section, on an enlarged scale, of my removable valve seat and casing connecting with the lower end of the valve-box.

I have illustrated my removable seat and casing in connection with a gas generating furnace A, and a superheater E, of a well known form of gas generating apparatus. The gas outlet pipes, B and C, connect respectively with the top and bottom of the generator A, and also with the gas delivery pipe B'', which connects with the bottom of the superheater or fixing chamber E.

The gas outlet pipe, B, is provided with a valve box, B', and pipe, C, is provided with a valve box, C', and to each of said boxes and pipes is connected the removable valve seat casing or section F, containing the detachable valve seats G, G'. The gas outlet pipes B and B'' and valve box B', are preferably lined with fire brick, as shown in Fig. 1. The valve boxes B' and C', are cylindrical and are adapted for the ball or hemispherical valves H and J.

The iron shell of the valve box B', is constructed at the bottom with an outwardly turned flange, $b$, and an inwardly turned flange $b'$, which latter projects inward over a recess containing the annular hollow valve seat G, for holding it in place. The valve seat casing or section F, is made detachable from the valve box and the pipe connection, and is constructed with an upper flange $f'$ and a lower flange, $f'''$, for connecting it to the valve box and delivery pipe by means of bolts or rivets in the usual manner. It is also constructed with an annular shoulder, $f$, forming, in connection with the inwardly turned flange, $b'$, an annular recess, $f''$, for receiving the annular hollow valve seat G, and holding it in place when the casing F is bolted to the valve box.

The valve seat G, is preferably formed with an annular channel, $g$, for the circulation of steam, water, or air and with a beveled upper edge, $g'$, for receiving the valve H; and it is also provided with screw-threaded openings in its outer wall in which are connected the inlet pipe $h$ and the outlet pipe $i$. The pipes $h$ and $i$, are properly screw-threaded for permitting nuts, $y$, with washers, to be screwed on them and against the wall of the casing for making a tight joint and holding the parts securely in place.

When fitting the section F, with its valve seat G in place, a ring of asbestos or other fire proof packing, $e$, is inserted between the valve seat and the flange, $b'$, for making a tight joint, so that there shall be no leakage of gas around the valve seat. Air, steam, or water, is supplied, in any convenient manner, through pipe $h$ and circulated through the channel, $g$, in the valve seat for keeping it cool. In practice, I prefer to circulate wet steam or water of condensation in the valve seat, for the reason that deposits of sedimentary matter in the channel are thereby avoided, and the resulting dry or superheated steam is then supplied to the generator. I may use a solid annular valve seat, $G'$, as shown in the valve box $C'$.

To the hemispherical valves H and J, are attached the rods, $h'$ and $j$, which pass up through the stuffing boxes $b''$ and $c$, and are pivotally connected above to the lever D. The valve rod, $h'$, passes up through hollow standard K, and is formed at the top with a rack bar, $h''$, which is guided in the standard K, and has meshing with it a pinion, $n$, which is fixed upon a short horizontal shaft, having secured to its outer end a hand wheel M. The shaft of the pinion and hand wheel is journaled in standard K. The rack bar, $h''$, after being raised, may be held in place by a pin or catch. Not here shown. The lever, D, is pivotally connected at $d$, to the fulcrum bar, L, which is pivotally connected at $l$, to a bracket or other support, and lever, D, is also pivoted at the end, $d'$, to the valve rod $h'$, and at its other end, $d''$, to the valve rod $j$.

It will be understood that, by means of the above mechanism, the valves are raised and lowered, the construction being such that neither valve can be closed upon its seat until after the other one has been raised from its seat, so that there shall always be a free passage for gas from the generator to the delivery pipe. The valves are balanced and can thus be readily operated to close upon either the upper or lower valve seat. This mechanism is not here claimed, as it is covered by my Patent No. 510,506.

In case the valve seat, G, becomes nicked or unevenly worn away at its contact edge, $g'$; or, if it becomes warped or twisted by the heat, it is conveniently removed by first detaching the section F, from the valve box and pipe $B''$, after which the valve seat can be lifted out and a new one substituted therefor. The section F is then bolted into position, connecting the valve box with the pipe $B''$, and then the inlet pipe, $h$ and outlet pipe $i$, are screwed into the valve seat. This operation can be quickly performed and the gas apparatus will therefore be thrown out of use for only a short time.

The device has proved very useful and effective in practice.

Having described my invention, what I claim, and desire to secure by Letters Patent, is—

A valve box having at its lower end the inwardly and outwardly turned flanges, $b$ and $b'$, in combination with a detachable valve seat casing or section F containing an annular recess, and a removable hollow annular valve seat in said recess and having inlet and outlet pipes $h$ and $i$, substantially as and for the purpose described.

In testimony whereof I affix my signature in presence of two witnesses.

OLAF N. GULDLIN.

Witnesses:
C. J. McLAIN,
WM. J. LENNART.